(12) United States Patent
Hwang

(10) Patent No.: US 8,370,692 B2
(45) Date of Patent: Feb. 5, 2013

(54) RECORDING AND/OR REPRODUCING METHOD, RECORDING AND/OR REPRODUCING APPARATUS AND INFORMATION STORAGE MEDIUM

(75) Inventor: Sung-hee Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1043 days.

(21) Appl. No.: 12/106,499

(22) Filed: Apr. 21, 2008

(65) Prior Publication Data

US 2009/0122682 A1    May 14, 2009

(30) Foreign Application Priority Data

Nov. 8, 2007 (KR) .................. 10-2007-0113720

(51) Int. Cl.
*H03M 13/00* (2006.01)
(52) U.S. Cl. ....................................................... 714/744
(58) Field of Classification Search ............... 714/774
See application file for complete search history.

(56) References Cited

U.S. PATENT DOCUMENTS

| | | | | |
|---|---|---|---|---|
| 5,191,565 A * | 3/1993 | Inoue et al. | | 369/284 |
| 5,732,088 A | 3/1998 | Sako | | |
| 7,170,841 B2 | 1/2007 | Shoji et al. | | |
| 7,221,644 B2 * | 5/2007 | Kobayashi et al. | | 369/275.5 |
| 2003/0002423 A1 | 1/2003 | Ishibashi et al. | | |
| 2004/0179445 A1 | 9/2004 | Park et al. | | |
| 2005/0195710 A1 * | 9/2005 | Koda et al. | | 369/47.14 |
| 2005/0270953 A1 * | 12/2005 | Okada et al. | | 369/100 |
| 2006/0007826 A1 * | 1/2006 | Hwang et al. | | 369/53.2 |
| 2006/0126472 A1 * | 6/2006 | Hwang et al. | | 369/53.17 |
| 2006/0230325 A1 | 10/2006 | Motohashi | | |
| 2007/0041280 A1 | 2/2007 | Nijboer et al. | | |
| 2007/0070843 A1 * | 3/2007 | Kobayashi | | 369/47.36 |
| 2008/0046794 A1 * | 2/2008 | Kobayashi et al. | | 714/752 |
| 2008/0279060 A1 * | 11/2008 | Nishi et al. | | 369/44.37 |
| 2010/0100694 A1 * | 4/2010 | Hwang et al. | | 711/155 |

FOREIGN PATENT DOCUMENTS

| | | |
|---|---|---|
| CN | 1397947 A | 2/2003 |
| CN | 1774762 A | 5/2006 |
| JP | 2004-206849 A | 7/2004 |
| JP | 2006-59528 | 3/2006 |
| JP | 2006-196176 A | 7/2006 |
| JP | 2006-294101 A | 10/2006 |
| KR | 2005-19650 | 3/2005 |
| WO | WO 2004/090890 A1 | 10/2004 |

OTHER PUBLICATIONS

International Search Report and Written Opinion issued in corresponding PCT International Application No. PCT/KR2008/00307 dated Oct. 8, 2008.
"The First Office Action" issued by the State Intellectual Property Office of P.R. China on May 20, 2011, in counterpart Chinese Patent Application No. 200880115196.1 (11 pages, including English translation).
Japanese Office Action issued Sep. 13, 2011, in counterpart Japanese Patent Application No. 2010-532986 (3 pages).

* cited by examiner

*Primary Examiner* — Joshua Lohn
(74) *Attorney, Agent, or Firm* — NSIP Law

(57) ABSTRACT

An information storage medium including two or more recording layers to reproduce or record data by using a same reproducing and/or recording optical system per layer includes error correction code (ECC) blocks recorded onto the two or more recording layers by using two or more data formats used to store user data.

31 Claims, 9 Drawing Sheets

FIG. 3A FIG. 3B
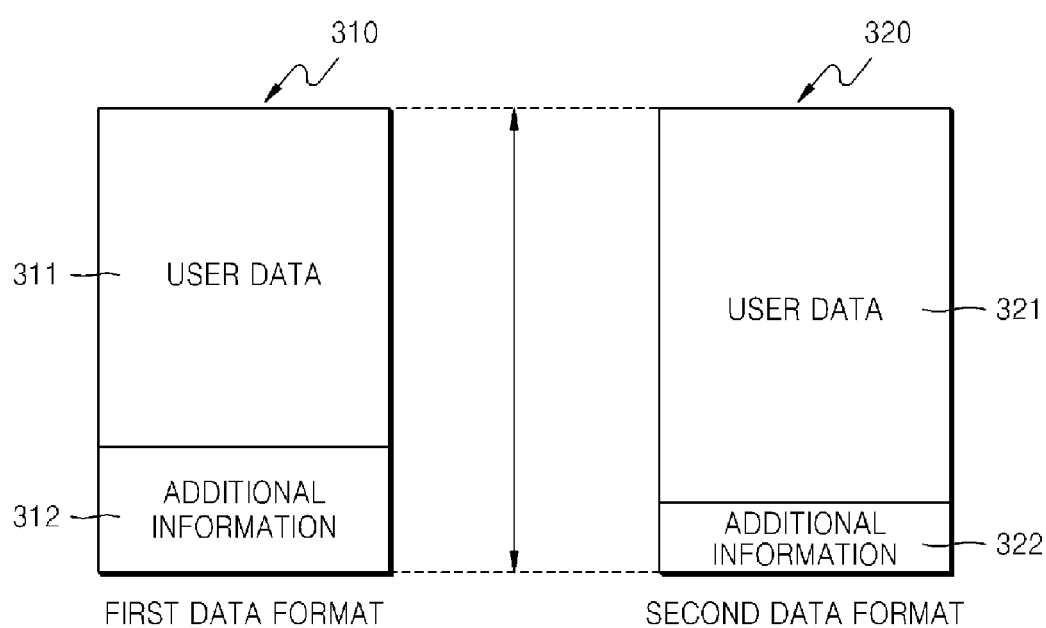

FIRST DATA FORMAT

SECOND DATA FORMAT

FIRST DATA FORMAT

SECOND DATA FORMAT

RECORDING AND/OR REPRODUCING METHOD, RECORDING AND/OR REPRODUCING APPARATUS AND INFORMATION STORAGE MEDIUM

CROSS-REFERENCE TO RELATED APPLICATION

This application claims the benefit of Korean Patent Application No. 2007-113720, filed Nov. 8, 2007 in the Korean Intellectual Property Office, the disclosure of which is incorporated herein by reference.

BACKGROUND OF THE INVENTION

1. Field of the Invention

Aspects of the present invention relate to a recording and/or reproducing method, a recording and/or reproducing apparatus, and an information storage medium therefor, and more particularly to a recording and/or reproducing method and a recording and/or reproducing apparatus to reduce a drop in data reliability or a reduction in data capacity due to different signal qualities of each layer of a multilayer information storage medium, and an information storage medium therefor.

2. Description of the Related Art

The development of high-capacity information storage media has resulted in active progress being made in the development of high-density multilayer information storage media. Discs of optical systems include cover layers in order to protect recording layers. The cover layers of multilayer discs are disposed between disc surfaces and recording layers. The thickness of cover layers of CDs, DVDs, and blu-ray DVDs (BDs) is 1.2 mm, 0.6 mm, and 0.1 mm, respectively. The greater the thickness of the cover layers, the higher the density of information that can be stored in the storage media. Cover layers of multilayer discs correspond to the multiple recording layers of the disc. The thicknesses of the cover layers vary according to a number of the recording layers. Therefore, a spot area where a light beam contacts a disc surface through an object lens varies according to a number of the recording layers. In 4, 8, and 16 multilayer discs, differences between minimum areas and maximum areas where the light beam contacts the disc surface must be increased. Therefore, the influence of dust particles on the light beam used to record and/or reproduce data to and or from the optical disc varies according to a number of recording layers. The degree of the variation is proportional to the number of recording layers. Thus, a method to overcome an error influence caused by dust, for each layer of multilayer discs, is needed.

FIG. 1 is a diagram to explain a difference in a spot area of each layer in accordance with different thicknesses of cover layers according to conventional technology. Referring to FIG. 1, since the thicknesses of cover layers vary according to a number of recording layers used in the disc, a spot area where a light beam contacts disc surfaces through an object lens varies according to a number of recording layers. That is, a spot area 2 of a cover layer 2 having a smaller thickness than a cover layer 1 is smaller than a spot area 1 of the cover layer 1, and the spot area 1 of the cover layer 1, which is a combination of the cover layer 2 and an additional cover layer between layer 2 and layer 1 and has a greater thickness than the cover layer 2, is greater than the spot area 2 of the cover layer 2. Thus, since a beam that is reflected by dust is blocked before reaching the target layer, the beam has a different degree of reflection by the dust according to a number of the recording layers. That is, the reflection amount of the beam is proportional to a "spot area"—an "area of the beam that is not incident/reflected by dust". However, the "area of the beam that is not incident/reflected by dust" particles having the same size on a disc surface remains constant according to recording layers, whereas the "spot area" changes due to a different thickness of each cover layer according to recording layers.

Although a multilayer disc has a different error influence per layer due to a defect factor such as the same-sized dust particles, fingerprints, scratches, bubbles, and the like on the disc surface since cover layers have different thicknesses according to a number of recording layers, a conventional application of the same data format irrespective of a recording layer causes the following problem.

If a data format is based on a recording layer that is least influenced by a defect factor according to data capacity, data reliability is subject to a recording layer that is most influenced by the defect factor. Thus, a disc lifetime is reduced.

Furthermore, if the data format is based on the recording layer that is most influenced by the defect factor in order to compensate for the data reliability, the amount of additional information used to correct an error that occurs in a disc relatively increases, causing a reduction in the data capacity.

For example, in a four-layer disc, first and second layers have a similar error influence by a defect factor such as dust on the first and second layers, whereas third and fourth layers have a double error influence by the same defect factor as in the first and second layers. A data format suitable for the first and second layers causes a drop in data reliability of the third and fourth layers. A data format suitable for the third and fourth layers that are relatively vulnerable to the error influence causes an increase in additional information of the first and second layers, which reduces data capacity.

A data format is generally formed of user data and additional information. The user data is referred to as information that is to be substantially stored. The additional information is referred to as information, other than the information that is substantially stored, which is necessary for recording and the substantially stored information onto a disc or reproducing the substantially stored information. The user data is generally scrambled or modulated before being recorded/stored onto the disc. Examples of the additional information include sync information, address information, and parity information of a general optical system. The additional information according to an aspect of the present invention may hereinafter be referred to as the parity information.

SUMMARY OF THE INVENTION

Aspects of the present invention provide a recording and/or reproducing method, and a recording and/or reproducing apparatus to reduce a drop in data reliability or a reduction in data capacity due to different signal qualities of each layer of a multilayer information storage medium, and an information storage medium therefor.

According to an aspect of the present invention, an information storage medium includes two or more recording layers on which data is recorded on and/or reproduced from by using a same recording and/or reproducing optical system for each of the two or more recording layers, wherein error correction code (ECC) blocks are recorded onto the two or more recording layers by using two or more data formats used to store user data.

According to an aspect of the present invention, an ECC block may be recorded onto a recording layer having a cover layer with a first thickness by using a data format from among the two or more data formats that has a first error correction performance, and an ECC block may be recorded onto another recording layer having another cover layer by using a data format from among the two or more data formats that has a second error correction performance which is relatively high compared to the first error correction performance.

According to an aspect of the present invention, each of the two or more recording layers include a disc management information area separate from a data area in which the user data is recorded, onto which at least one of the ECC blocks is recorded by using the same data format for each of the disc management information areas.

According to an aspect of the present invention, first replacement data for replacing first user data of a first type ECC having a first data format by performing a defect management operation or a logical overwrite (LOW) operation is stored onto the first type ECC block having the first data format, and second replacement data for replacing second user data of a second type ECC block having a second data format by performing the defect management operation or the LOW operation is stored onto the second type ECC block having the second data format.

According to an aspect of the present invention, the information storage medium further comprises a first spare area formed in one of the recording layers onto which the first type ECC block is recorded and having the first replacement data of the first type ECC block recorded thereon, and a second spare area formed in a another one of the recording layers onto which the second type ECC block is recorded and having the second replacement data of the second type ECC block recorded thereon.

According to another aspect of the present invention, a method of recording data onto an information storage medium including two or more recording layers to reproduce or record the data by using a same reproducing and/or recording optical system per layer, includes recording ECC blocks onto the two or more recording layers by using two or more data formats used to store user data.

According to an aspect of the present invention, the recording of the ECC blocks further includes recording one of the ECC blocks onto one of the recording layers having a cover layer with a first thickness by using one of the data formats which has a first error correction performance, and recording another one of the ECC blocks onto another one of the recording layers having another cover layer with a second thickness which is thinner than the first thickness by using another one of the data formats having a second error correction performance which is relatively high compared to the first error correction performance.

According to an aspect of the present invention, each recording layer includes a disc management information area, and the recording of the ECC blocks further includes recording the ECC blocks onto the disc management information area of each recording layer by using the same data format.

According to an aspect of the present invention, the recording of the ECC blocks further comprises storing first replacement data for replacing first user data of a first type ECC block having a first data format by performing a defect management operation or a logical overwrite (LOW) operation onto the first type ECC block having the first data format and storing second replacement data for replacing second user data of a second type ECC block having a second data format by performing the defect management operation or the LOW operation onto the second type ECC block having the second data format.

According to an aspect of the present invention, the recording of the ECC blocks further includes recording the first replacement data onto a first spare area of the information storage medium and recording the second replacement data onto a second spare area of the information storage medium that is separate from the first spare area.

According to another aspect of the present invention, an apparatus to record data onto an information storage medium including two or more recording layers to reproduce or record the data by using a same reproducing and/or recording optical system per layer, includes a recording unit to record the data onto the information storage medium, and a controller to control the recording unit to record ECC blocks onto the two or more recording layers by using two or more data formats used to store user data.

According to another aspect of the present invention, a method of reproducing data from an information storage medium including two or more recording layers to reproduce or record the data by using a same reproducing and/or recording optical system per layer includes reproducing ECC blocks from the two or more recording layers by using two or more data formats used to store user data, and reproducing the ECC blocks by using the two or more data formats.

According to another aspect of the present invention, the reproducing of the ECC blocks further includes reproducing one of the ECC blocks from a recording layer having a cover layer with a first thickness by using one of the data formats having a first error correction performance, and reproducing another one of the ECC blocks from another recording layer having another cover layer with a thickness which is thinner than the first thickness by using another one of the data formats having a second error correction performance which is relatively high compared to the first error correction performance.

According to another aspect of the present invention, each recording layer includes a disc management information area, and the reproducing of the ECC blocks further includes reproducing the ECC blocks from the disc management information area of each recording layer by using the same data format.

According to an aspect of the present invention, the reproducing of the ECC blocks comprises reading first replacement data for replacing first user data of a first type ECC block having a first data format by performing a defect management operation or a logical overwrite (LOW) operation from the first type ECC block having the first data format; and reading second replacement data for replacing second user data of a second type ECC block having a second data format by performing the defect management operation or the LOW operation from the second type ECC block having the second data format.

According to an aspect of the present invention, the reproducing of the ECC blocks further includes reproducing the first replacement data from a first spare area of the information storage medium and reproducing the second replacement data from a second spare area that is separate from the first spare area.

According to another aspect of the present invention, an apparatus to reproduce data from an information storage medium including two or more recording layers to reproduce or record the data by using a same reproducing and/or recording optical system per layer, includes a reproducing unit to reproduce the data from the information storage medium, and a controller to control the reproducing unit to read ECC blocks from the two or more recording layers by using two or more data formats used to store user data, and to reproduce the ECC blocks by using the two or more data formats.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 3A and 3B illustrate two different data formats according to an embodiment of the present invention;

DETAILED DESCRIPTION OF THE EMBODIMENTS

Figure 1:
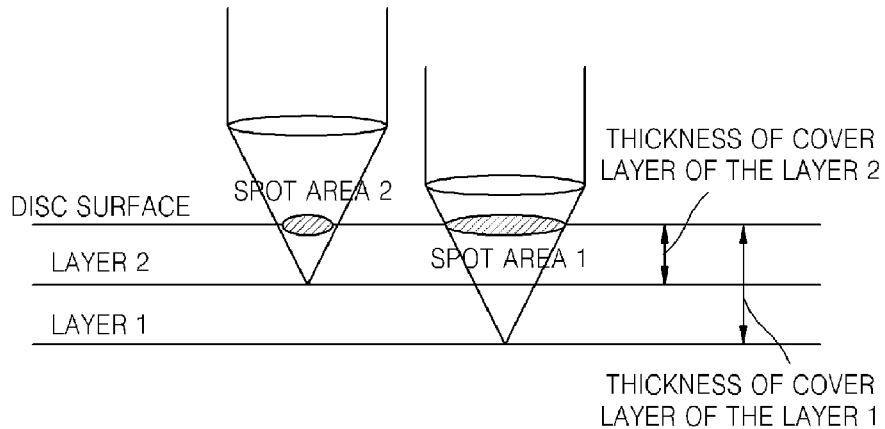
FIG. 1 a diagram to explain a difference in a spot area of each layer in accordance with different thicknesses of cover layers according to conventional technology.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects of the present invention provide a multi data format used for a multilayer disc having at least two types of data formats, in order to resolve a problem of a reduction in the data reliability or the disc capacity since the multilayer disc has a different error influence per layer due to a defect factor such as dust, fingerprints, scratches, bubbles, and the like on the disc surface. The multilayer disc according to aspects of the present invention is compatible with the same reproducing and/or recording optical system per layer. The reproducing and/or recording optical system refers to, for example, a recording and/or reproducing apparatus which uses the same type of reproducing and/or recording wavelengths or the same number of openings of an object lens. In other words, the multilayer disc according to aspects of the present invention does not have a first layer that is a recording layer according to a first standard, e.g., a BD, and a second layer that is a recording layer according to a second standard, e.g., a DVD, but instead has a first layer and a second layer that are recording layers according to the same standard.

Figure 2:
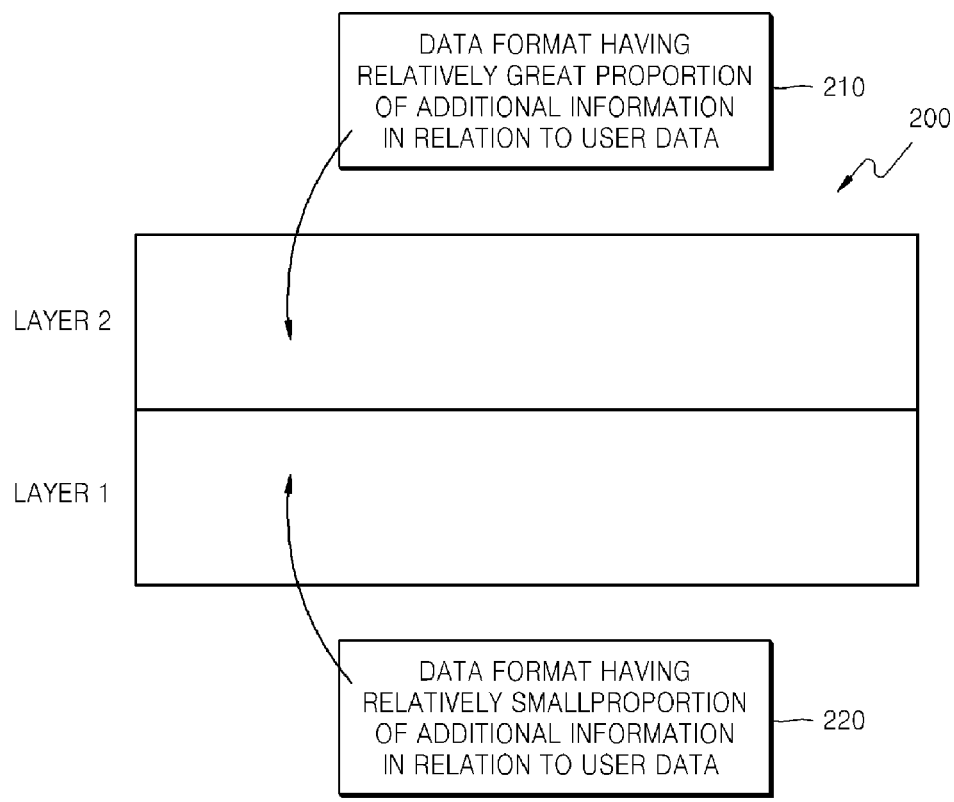
FIG. 2 is a reference diagram illustrating a concept of applying a different data format to each layer of a multilayer disc having the same reproducing and/or recording optical system per layer according to an embodiment of the present invention.

FIG. 2 is a reference diagram illustrating a concept of applying a different data format to each layer of a multilayer disc 200 which is compatible with the same reproducing and/or recording optical system per layer according to an embodiment of the present invention. Referring to FIG. 2, a data format 220 having a relatively small proportion of additional information in relation to user data is applied to a layer 1 having a relatively small error influence due to a defect factor of the disc surface, whereas a data format 210 having a relatively great proportion of additional information in relation to user data is applied to a layer 2 having a relatively great error influence due to the defect factor of the disc surface. Therefore, a space to guarantee data reliability of the multilayer disc and to record the greatest amount of user data is secured when the multilayer disc is reproduced. According to an aspect of the present invention, the additional information comprises parity information. However, the additional information is not limited to being parity information in other aspects, and may instead be other types of information used to record and/or reproduce the user data, such as sync information, address information, or any combination of these three types of information.

A method of determining a relatively small or great proportion of additional information in relation to the user data will now be described.

FIGS. 3A and 3B illustrate two different data formats according to an embodiment of the present invention. Referring to FIGS. 3A and 3B, a first data format 310 and a second data format 320 have the same size of data including user data and additional information. The first data format 310 has a relatively great proportion of additional information in relation to the user data compared to the second data format 320. The second data format 320 has a relatively small proportion of additional information in relation to the user data compared to the first data format 310. The data reliability of the first data format 310 having the relatively great proportion of additional information in relation to the user data is higher than that of the second data format 320.

Figure 4A:
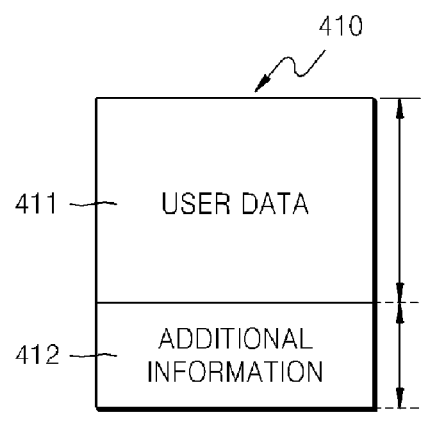
FIGS. 4A and 4B illustrate two different data formats according to another embodiment of the present invention, in which the two data formats have the same size of additional information and have a different size of user data.
Figure 4B:
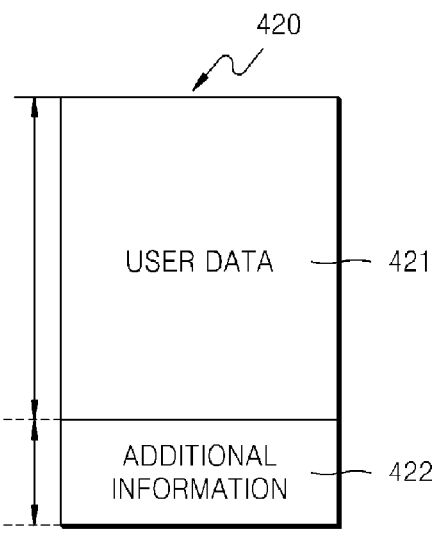

FIGS. 4A and 4B illustrate two different data formats 410 and 420 according to another embodiment of the present invention, in which each of the two data formats 410 and 420 have the same size of additional information and have a different size of user data. That is, the two data formats 410 and 420 each have a relatively small or great proportion of additional information in relation to the user data by allowing the two data formats 410 and 420 to have the same size of additional information and adjusting the size of the user data that is to be stored therein.

Referring to FIGS. 4A and 4B, the size of additional information 412 of a first data format 410 is the same as the size of additional information 422 of a second data format 420, whereas the size of user data 411 of the first data format 410 is different than that of the size of user data 421 of the second data format 420. Since the size of the additional information 412 is the same as the size of the additional information 422 and the size of the user data 411 is smaller than the size of the user data 421, the encoding reliability of the first data format 410 is higher than the encoding reliability of the second data format 420.

Figure 5A:
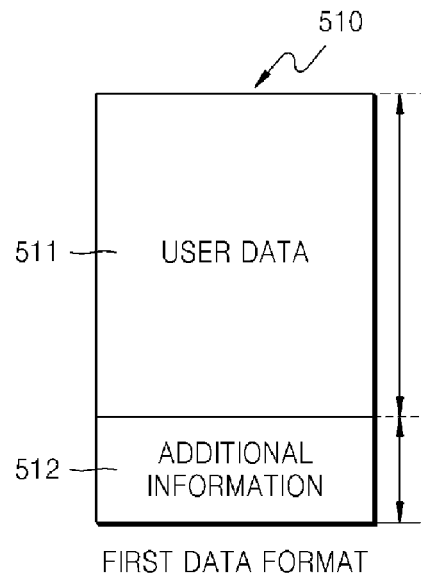
FIGS. 5A and 5B illustrate two different data formats according to another embodiment of the present invention, in which the two data formats have the same size of user data and have a different size of additional information.
Figure 5B:
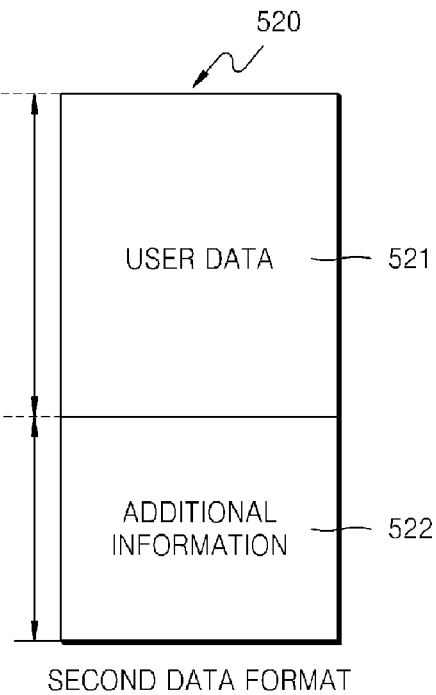

FIGS. 5A and 5B illustrate two different data formats 510 and 520 according to another embodiment of the present invention, in which the two data formats 510 and 520 have the same size of user data and have a different size of additional information. That is, the two data formats 510 and 520 have a relatively small or great proportion of additional information in relation to the user data by allowing the two data formats 510 and 520 to have the same size of user data that is to be stored therein and adjusting the size of the additional information thereof.

Referring to FIGS. 5A and 5B, the size of additional information 512 of a first data format 510 is different than that of the size of additional information 522 of a second data format 520, whereas the size of user data 511 of the first data format 510 is the same as the size of user data 521 of the second data format 420. Since the size of the user data 521 is the same as the size of the user data 511, and the size of the additional information 522 is greater than the size of the additional information 512, the encoding reliability of the first data format 510 is higher than the size of the second data format 520.

In addition to the data formats of FIGS. 3A, 3B, 4A, 4B, 5A, and 5B, there is a method of varying the length of an error correction code (ECC) word to error-correct user data of a data format. Although additional information is added to user data in the same ratio, the longer the error correction code word is, the more the error correction performance increases.

Although data is conventionally recorded onto a multilayer disc using a different data format per layer, in order to reduce complexity associated with performing data operations on a disc having a multi data format, aspects of the present invention provide data, which is recorded onto a disc management information area used to record information regarding disc recording and/or reproducing management operations, having the same data format irrespective of layers, making it easier to operate the multilayer disc.

Figure 6:
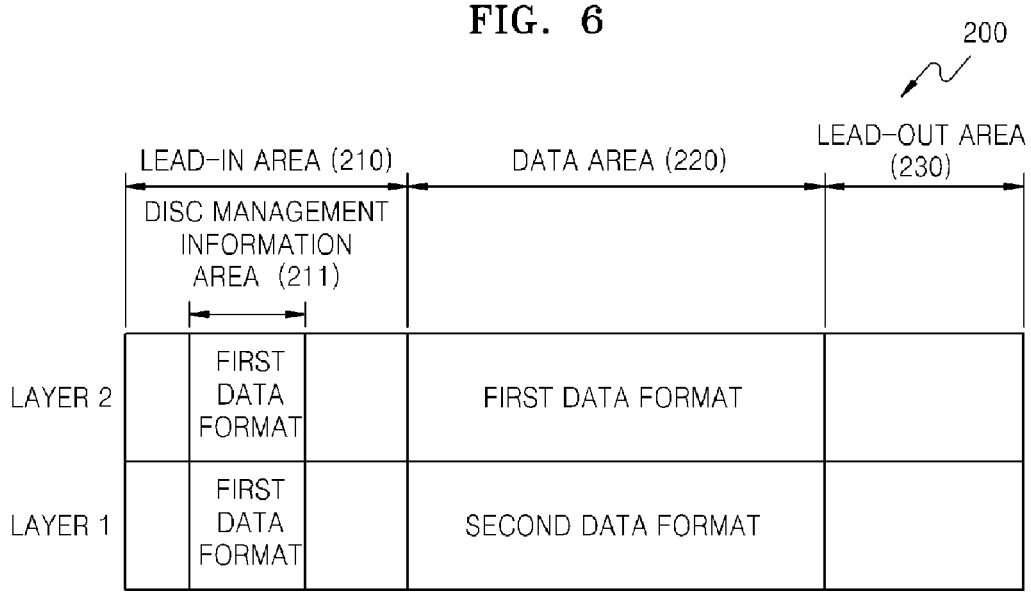
FIG. 6 illustrates a multilayer disc having a data area to which a different data format is applied and a disc management information area to which the same data format is applied per layer thereof according to an embodiment of the present invention.

FIG. 6 illustrates a multilayer disc 200 having a data area on which a different data format is applied per layer thereof and a disc management information area on which the same data format is applied per layer thereof according to an embodiment of the present invention. Referring to FIG. 6, the multilayer disc 200 comprises a layer 1 and a layer 2 each having a lead-in area 210, a data area 220, and a lead-out area 230. The lead-in area 210 of the layers 1 and 2 includes a disc management information area 211. Although data is recorded onto the data area 220 of the layer 1 by using a second data format and onto the data area 220 of the layer 2 by using a first data format, the data is recorded on the disc management information area 211 included in the lead-in area 210 of the layers 1 and 2 by using a single data format, e.g., the first data format. This is because it is a frequent occurrence that when a recording and/or reproducing apparatus uses disc management information, the recording and/or reproducing apparatus continuously records and/or reproduces disc management information of the disc management information area 211 of the layers 1 and 2, or manages a combination of the disc management information of the disc management information area 211 of the layers and 1 and 2.

Figure 7:
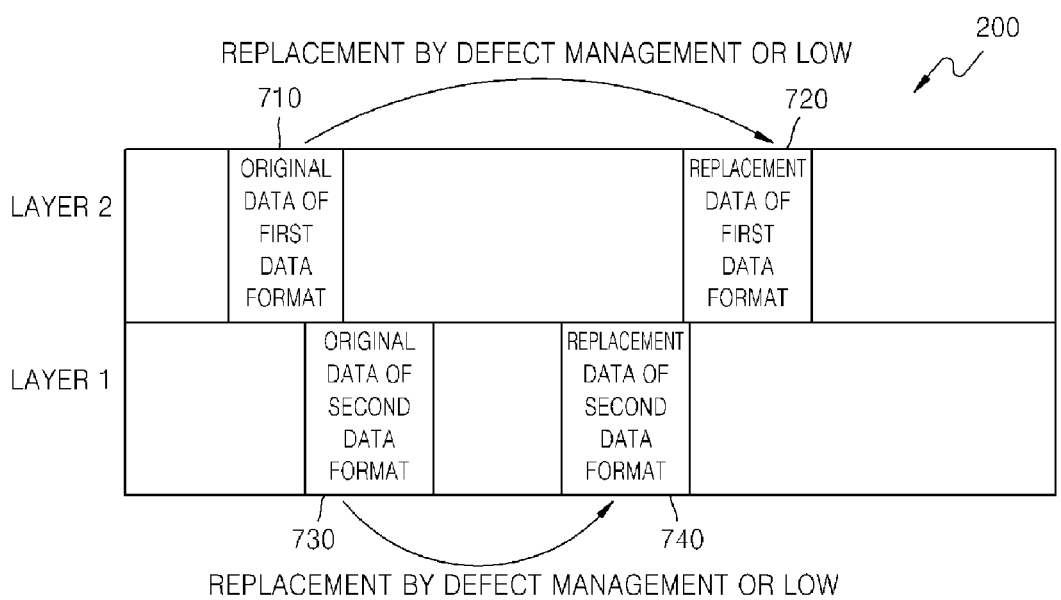
FIG. 7 illustrates a multilayer disc having original data and replacement data as a replacement of the original data to which the same data format is applied when data is replaced by defect management or a local overwrite (LOW) according to an embodiment of the present invention.

FIG. 7 illustrates a multilayer disc 200 having original data and replacement data as a replacement of the original data to which the same data format is applied when data is replaced by defect management or a local overwrite (LOW) according to an embodiment of the present invention. When data is "replaced by defect management," this phrase refers to replacement data as a replacement of the defective data being recorded onto another area of the disc when a defect is detected from data recorded onto a predetermined area of a disc. When data is "replaced by the LOW," this phrase refers to when updated replacement data is recorded onto another area of a disc in order to update data recorded on a predetermined area of the disc. When data is replaced by defect management operation or the LOW, an application of the same data format to the original data and the replacement data makes it possible to easily manage the data.

Referring to FIG. 7, replacement data 720 as a replacement of original data 710 recorded onto a layer 2 of the multilayer disc 200 by the defect management or the LOW using a first data format is recorded onto the layer 2 by using the first data format. Replacement data 740 as a replacement of original data 730 recorded onto a layer 1 of the multilayer disc 200 by the defect management or the LOW by using a second data format is recorded onto the layer 2 by using the second data format.

Figure 8:
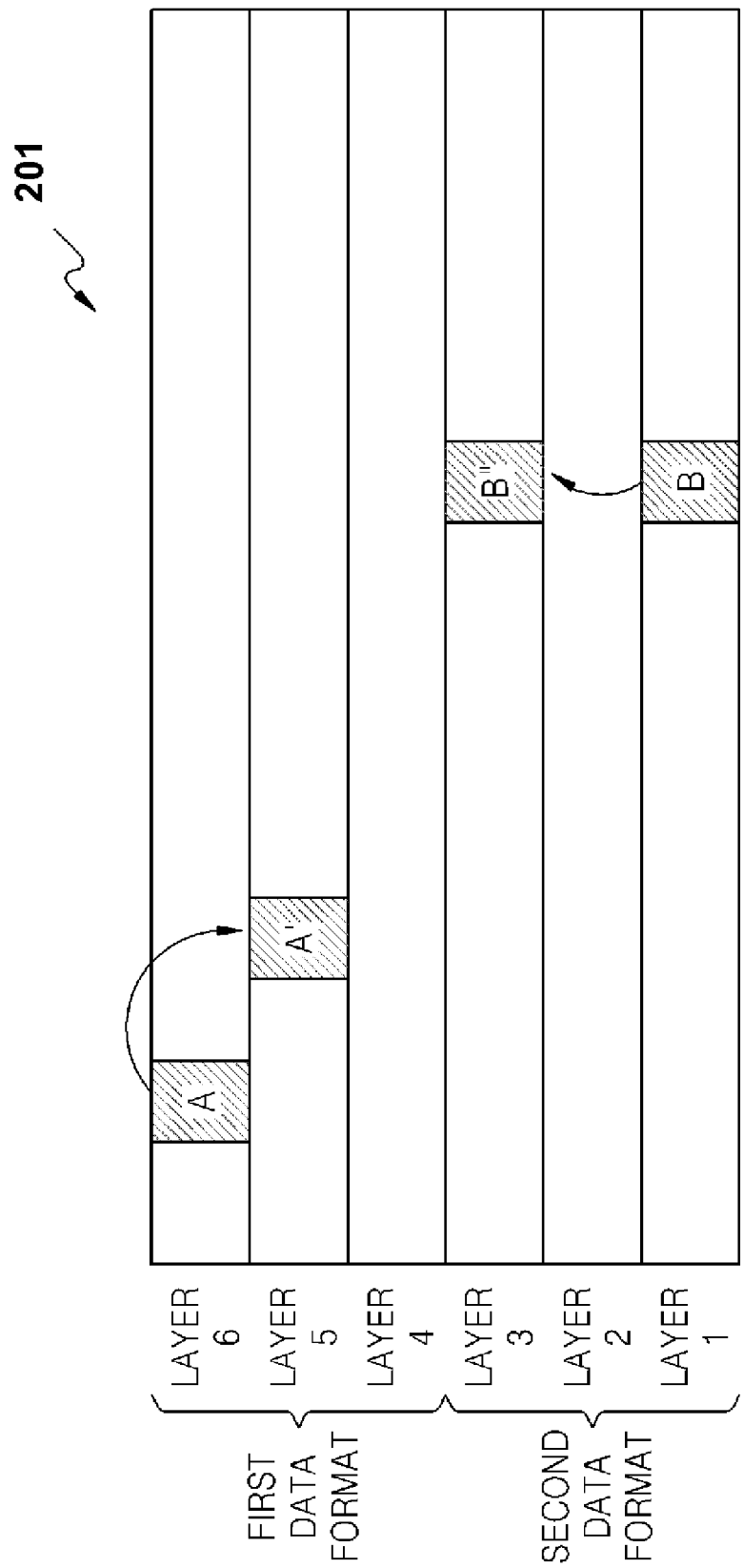
FIG. 8 illustrates a six-layer disc to which the embodiment of FIG. 7 is applied according to an embodiment of the present invention.

FIG. 8 illustrates a six-layer disc 201 to which the embodiment of FIG. 7 is applied according to an embodiment of the present invention. Referring to FIG. 8, data is recorded onto the six-layer disc using two data formats. When the data is recorded onto layers 1, 2, and 3 by using a second data format, and onto layers 4, 5, and 6 by using a first data format, replacement data due to a defect occurring in one or more of the layers 1, 2, or 3 or by the LOW is recorded onto the one or more of the layers 1, 2, or 3, and replacement data which is recorded due to a defect occurring in one or more of the layers 4, 5, or 6 or by the LOW is recorded onto one or more of the layers 4, 5, or 6. It is understood that aspects of the present invention may be employed with optical discs having more or less than six layers.

In more detail, replacement data A' due to a defect in original data A recorded onto the layer 6 or by the LOW is recorded onto the layer 5, and replacement data B' due to a defect with original data B recorded onto the layer 1 or by the LOW is recorded onto the layer 3. However, aspects of the present invention are not limited thereto. Replacement data A' due to the defect with original data A recorded onto the layer 6 or by the LOW is recorded onto the layer 4 or 6. Replacement data B' due to the defect with original data B recorded onto the layer 1 or by the LOW is recorded onto the layer 3.

Since the data is recorded onto the layers 1, 2, and 3 and onto the layers 4, 5, and 6 by using a different data format, the data is easily managed by recording replacement data as a replacement of the data onto a layer by using the same data format.

Figure 9:
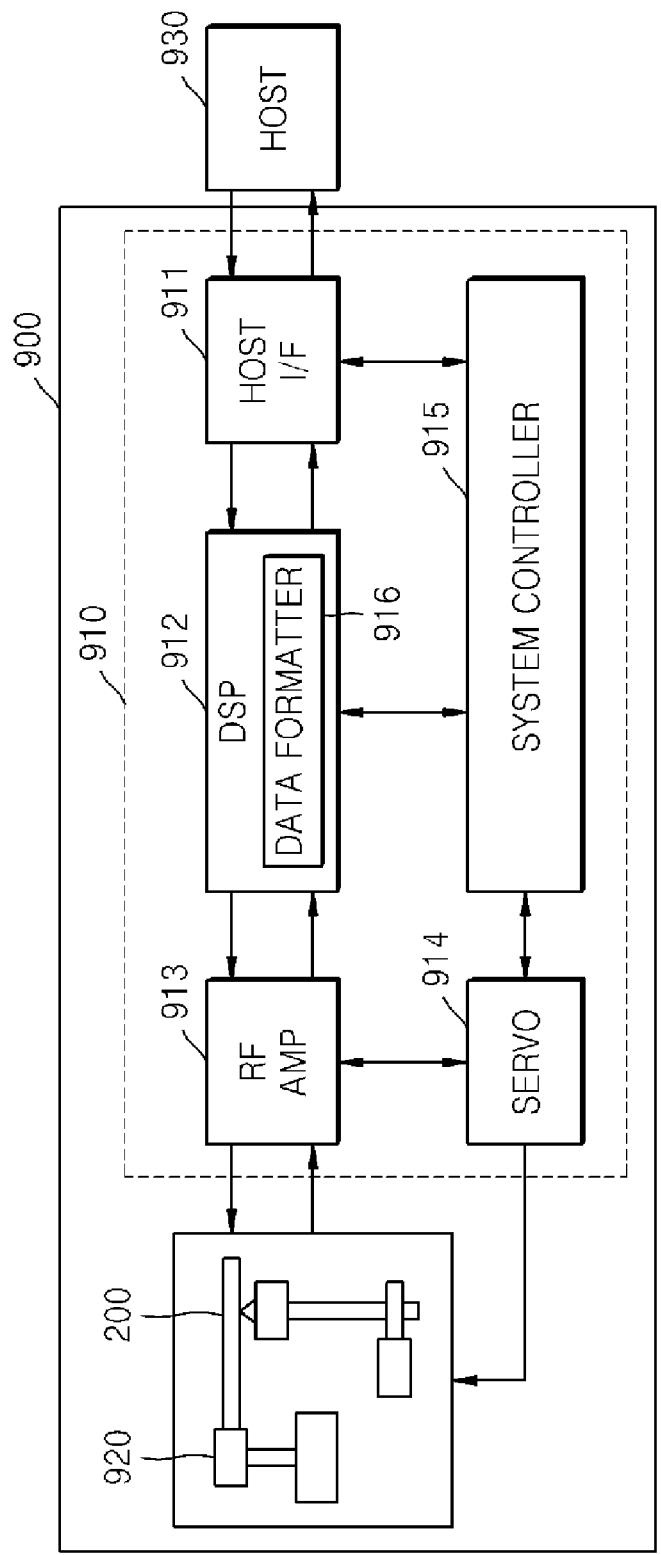
FIG. 9 is a schematic block diagram of a recording and/or reproducing apparatus according to an embodiment of the present invention.

FIG. 9 is a schematic block diagram of a recording and/or reproducing apparatus 900 according to an embodiment of the present invention. Referring to FIG. 9, the recording and/or reproducing apparatus 900 which records and/or reproduces data includes a recording and/or reproducing unit 920 and a controller 910. The recording and/or reproducing unit 920 records the data onto an information storage medium, e.g., a disc 200 in which the same reproducing and/or recording optical system is used per layer, according to the control of the controller 910 and reproduces data in order to reproduce the data recorded onto the disc 200. The controller 910 controls the recording and/or reproducing unit 920 to record and/or reproduce data and performs signal processing on the data to be recorded and on the reproduced data.

In particular, the controller 910 controls the recording and/or reproducing unit 910 to record ECC blocks having at least two data formats to store user data onto a different recording layer of the information storage medium, or processes the data reproduced by the recording and/or reproducing unit 920, and obtains valid data.

Furthermore, according to an aspect of the present invention, the controller 910 controls the recording and/or reproducing unit 920 to record an ECC block onto a recording layer having a thick cover layer by using a data format which is relatively low in terms of error correction performance, and to record an ECC block onto a recording layer having a thin cover layer by using a data format which is relatively high in terms of error correction performance.

When each recording layer of the disc 200 includes a disc management information area, the controller 910 controls the recording and/or reading unit 920 to record ECC blocks onto the disc management information area of each recording layer by using the same data format. According to an aspect of the present invention, the controller 910 controls the recording and/or reproducing unit 920 to record first replacement data by defect management of first user data recorded onto an ECC block by using a first data format or by the LOW onto an ECC block using the first data format, and to record second replacement data by defect management of second user data recorded onto an ECC block by using a second data format or by the LOW onto an ECC block by using the second data format.

The controller 910 controls the recording and/or reproducing unit 920 to record the first replacement data onto a first spare area and to record the second replacement data onto a second spare area that is separate from the first spare area. It is understood that the first and second spare areas may be located in various places throughout the disc 200, such as the lead-in area 210 or the data area 220 (FIG. 6).

The recording and/or reproducing unit 920 includes a pickup. The disc 200 is installed in the pickup. The pickup emits or receives a light to transfer data with respect to the disc 200. The controller 910 comprises a host interface (I/F) 911, a digital signal processor (DSP) 912, a radio frequency (RF) amplifier (AMP) 913, a servo 914, and a system controller 915.

The host 930 receives a data recording and/or reproducing instruction from a user and transfers the data recording and/or reproducing instruction to the recording and/or reproducing apparatus 900 through the host I/F 911. The host I/F 911 interfaces with the host 930 and the recording and/or reproducing apparatus 900. The system controller 915 determines a data format of data according to the data recording and/or reproducing instruction received from the host 930 and controls a data formatter/deformatter 916 of the DSP 912 to encode data to be recorded by using the determined data format.

In particular, the DSP 912 includes the data formatter/deformatter 916 which includes at least two data formats. The data formatter/deformatter 916 ECC encodes the user data by using an ECC block that is to be recorded onto each recording layer according to the control of the system controller 915, inserts an error detection code (EDC), address information, etc. in the encoded user data, and applies data formats appropriate to the recording layers to the user data. The DSP 912 modulates the user data having the data formats, inserts a sync pattern into the user data at a predetermined period, and forms recording unit blocks. The RF AMP 913 changes the user data that is output from the DSP 912 into RF signals. The pickup 920 records the RF signals that are output from the RF AMP 913 onto the disc 200. The servo 914 receives an instruction necessary for a servo control from the system controller 915 and servo-controls the pickup 920.

The host I/F 911 receives a reproduction instruction from the host 930 when the user data is reproduced. The system controller 915 performs initialization necessary for the reproduction of the user data.

The system controller 915 controls the recording and/or reproducing unit 920 to reproduce recording management data that is recorded onto a predetermined area of the disc 200. In particular, according to an aspect of the present invention, the system controller 915 controls the recording and/or reproducing unit 920 to reproduce ECC blocks having at least two data formats to store the user data from a different recording layer of the disc 200. The system controller 915 controls the recording and/or reproducing unit 920 to reproduce the ECC block from the recording layer having the thick cover layer by using the data format which is relatively low in terms of error correction performance, and to reproduce the ECC block from the recording layer having the thin cover layer using the data format which is relatively high in terms of error correction performance.

According to an aspect of the present invention, when each recording layer of the disc 200 includes the disc management information area, the system controller 915 controls the recording and/or reproducing unit 920 to reproduce ECC blocks from the disc management information area of each recording layer by using the same data format. However, it is understood that the disc 200 is not required to have a disc management information area in each recording layer according to other aspects of the present invention.

The pickup 920 irradiates a laser beam onto the disc 200, receives the reflected laser beam from the disc 200, and outputs an optical signal. The RF AMP 913 changes the optical signal that is output from the pickup 920 into an RF signal, provides the DSP 912 with modulated data that is obtained from the RF signal, and provides the servo 914 with a control servo signal obtained from the RF signal. The DSP 912 demodulates the modulated data and outputs data that is ECC error corrected. In particular, the data formatter/deformatter 916 of the DSP 912 receives a determination signal indicating a recording layer from which data to be decoded is read, for example, whether to deformat the data by using a first data format or a second data format, from the system controller 915, and decodes the data to be decoded according to the determination signal. According to an aspect of the present invention, the data formatter/deformatter 916 decodes the first replacement data of the first user data recorded onto the ECC block by using the first data format or by the LOW by using the first data format, and decodes the second replacement data of the second user data recorded onto the ECC block by using the second data format or by the LOW by using the second data format.

Meanwhile, the servo 914 receives the servo signal from the RF AMP 913 and the instructions necessary for the servo control from the system controller 915, and performs a servo control operation for the pickup 920. The host I/F 911 sends the data received from the DSP 912 to the host 930.

Figure 10:
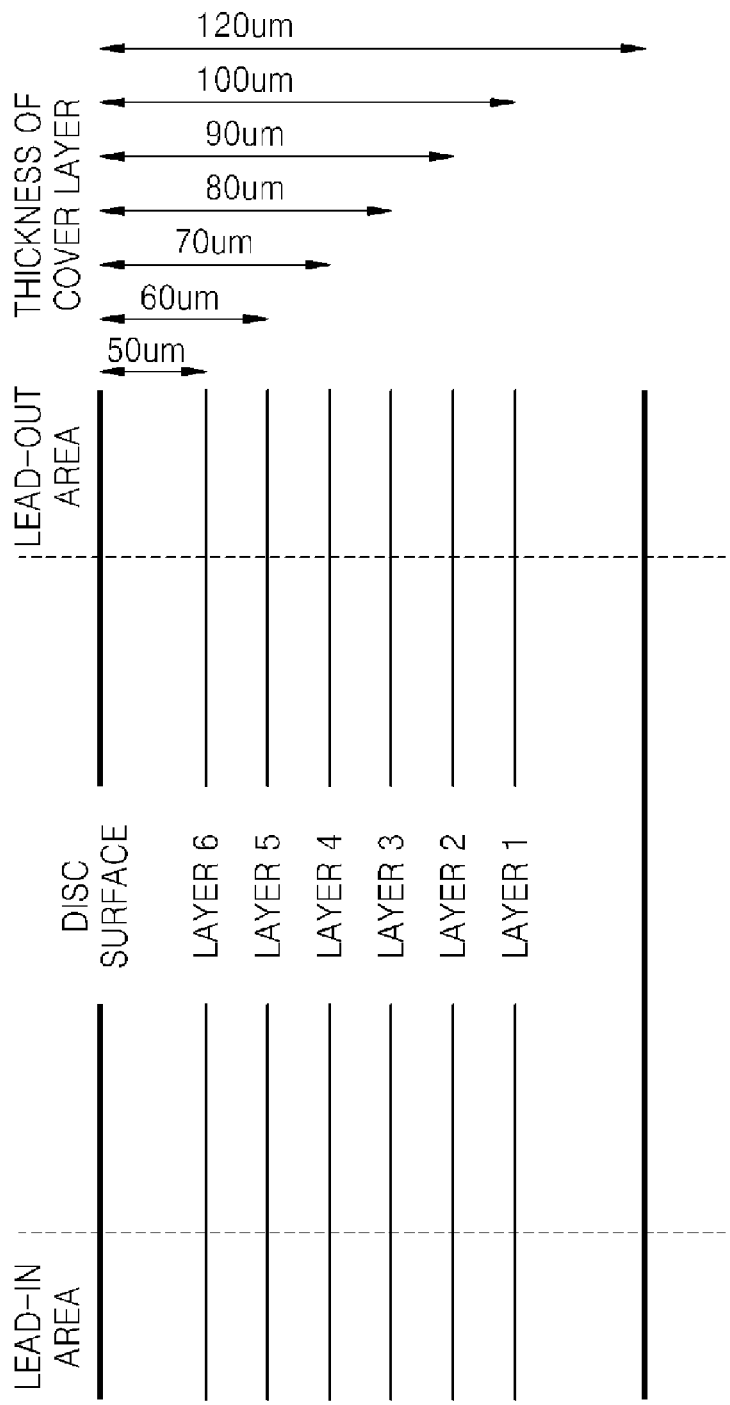
FIG. 10 illustrates the thickness of each cover layer of a six-layer disc according to an embodiment of the present invention.

FIG. 10 illustrates the thickness of each cover layer of a six-layer disc, such as, for example, the six-layer disc 201 shown in FIG. 8, according to an embodiment of the present invention. Referring to FIG. 10, the thickness of each cover layer of layers 1, 2, 3, 4, 5, and 6 of the six-layer disc is 100 μm, 90 μm, 80 μm, 70 m, 60 μm, and 50 μm, respectively. It is understood, however, that aspects of the present invention can be implemented in six-layer discs having cover layers with different thicknesses from those shown in FIG. 10.

Figure 11:
FIGS. 11A and 11B illustrate an error correction code (ECC) block 1 for a first data format used to store user data in 128 KB units on the six-layer disc of FIG. 10 and an ECC block 2 for a second data format used to store the user data in 136 KB units on the six-layer disc of FIG. 10 according to an embodiment of the present invention.

FIGS. 11A and 11B respectively illustrate an ECC block 1 for a first data format used to store user data in 128 KB units on the six-layer disc 201 of FIG. 10 and an ECC block 2 for a second data format used to store the user data in 136 KB units on the six-layer disc 201 of FIG. 10 according to an embodiment of the present invention.

Table 1 shows values of an optical system specification applied to the present embodiment.

TABLE 1

| | |
|---|---|
| LD wavelength(λ) | 405 nm |
| Numerical Aperture(NA) | 0.85 |
| Cover Layer Thickness(t) | 10/20/ . . . 90/100 μm |
| Refractive Index(n) | 1.60 |

FIG. 11A is a diagram of the structure of the ECC block 1 for the first data format used to store user data in 128 KB units on the six-layer disc 201. FIG. 11B is a diagram of the structure of the ECC block 2 for the second data format used to store the user data in 136 KB units on the six-layer disc 201.

Referring to FIGS. 11A and 11B, the size of the ECC blocks 1 and 2 is 248×640. The same size of the ECC blocks 1 and 2 makes it possible to resolve the complexity associated with conventional operations of using two ECC blocks with different sizes by using the same recording unit format that is converted into substantial recording units by modulation, addition of a sync pattern, etc., in order to record the user data onto a substantial information storage medium. Both reed-solomon (RS) and low-density parity check (LDPC) codes can be applied to the ECC blocks 1 and 2 as ECC codes according to aspects of the present invention. It is understood that either RS or LDPC codes can be applied to one or both of the ECC blocks 1 and 2, or that a combination of both the RS and LDPC codes can be applied to one or both of the ECC blocks 1 and 2. 640 RS codes (248,208) are applied to the ECC block 1 and 640 RS codes (248,216) are applied to the ECC block 2. The ECC blocks 1 and 2 are interleaved, respectively, and then modulated using a recording modulation code. The sync pattern is inserted into the modulated ECC blocks 1 and 2 at a predetermined period. The recording unit blocks formed as such are recorded onto the information storage medium 201. The recording unit block formed by the ECC block 1 is recorded onto the layers 4, 5, and 6 which are relatively more influenced by a defect factor, whereas the recording unit block formed by the ECC block 2 is recorded onto the layers 1, 2, and 3 which are relatively less influenced by the defect factor. It is understood that the ECC blocks 1 and 2 are not limited to being applied to an equal number of layers, for example, the ECC block 1 may be recorded only on layer 6, and the ECC block 2 may be recorded on the remaining layers 1-5.

Figure 12:
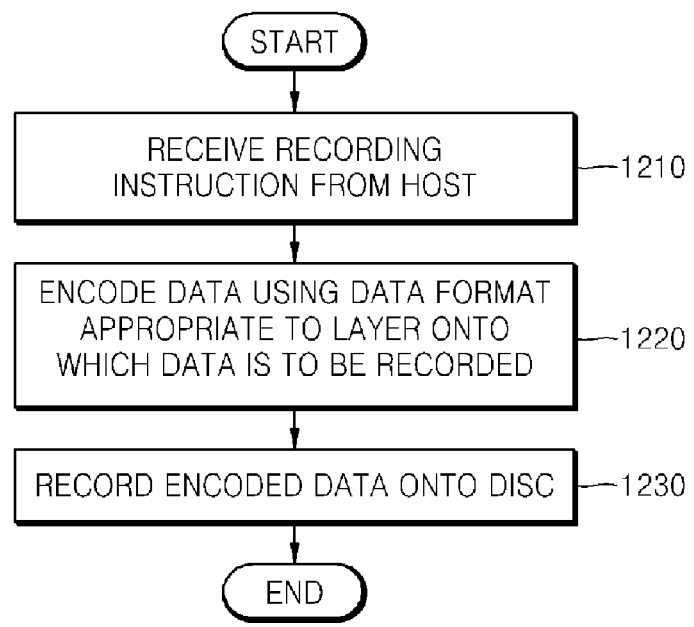
FIG. 12 is a flowchart illustrating a method of recording user data according to an embodiment of the present invention.

FIG. 12 is a flowchart illustrating a method of recording user data according to an embodiment of the present invention. Referring to FIG. 12, a recording and/or reproducing apparatus, such as, for example, the recording and/or reproducing apparatus 900 shown in FIG. 9, receives a recording instruction from the host 930 at operation 1210. In more detail, the host 930 sends the recording instruction, user data that is to be recorded, and a logical sector number on which the user data is to be recorded to the recording and/or reproducing apparatus 900. The host I/F 911 converts the local sector number into a physical sector number according to the recording instruction received from the host 930.

The recording and/or reproducing apparatus 900 encodes the user data by using a data format appropriate to a layer on which the user data is to be recorded at operation 1220. In more detail, the system controller 915 sends an instruction to the data formatter 916 to form the data format appropriate to the layer corresponding to the physical sector number. The data formatter 916 ECC encodes the user data by using an ECC block having the data format appropriate to the layer according to the control of the system controller 915, inserts an error detection code (EDC), address information, etc. into the user data, and forms the data format. The DSP 912 modulates the data format, inserts a sync pattern into the data format at a predetermined period, forms a recording unit block, and provides the RF AMP 913 with the recording unit block. The RF AMP 913 generates a recording pulse suitable for the recording unit block and transmits the recording pulse to the pickup 920.

The recording and/or reproducing apparatus 900 records the encoded user data onto a disc at operation 1230. In more detail, the servo 914 controls the pickup 920 to move to a disc position corresponding to the physical sector number onto which the user data is to be recorded according to the instruction of the system controller 915. The pickup 920 adjusts the amount of light according to the recording pulse and records the user data on a recording layer.

Figure 13:
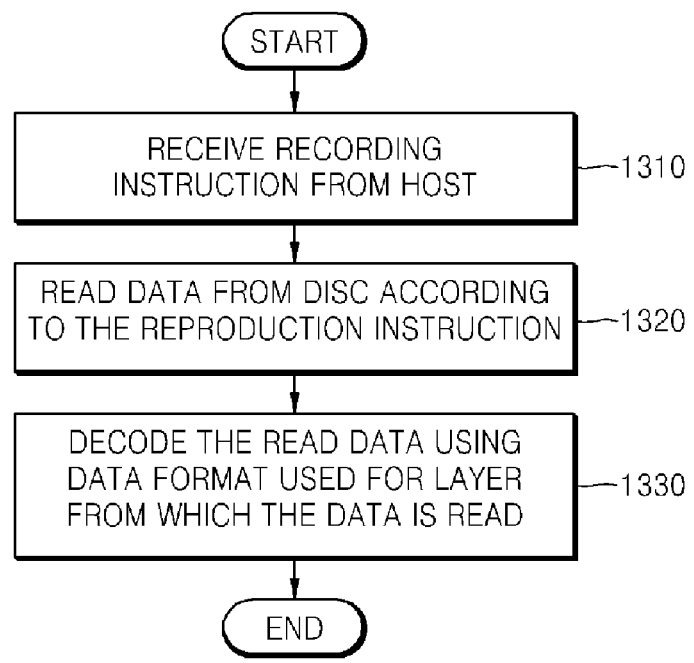
FIG. 13 is a flowchart illustrating a method of reproducing user data according to an embodiment of the present invention.

FIG. 13 is a flowchart illustrating a method of reproducing user data according to an embodiment of the present invention. Referring to FIG. 13, a recording and/or reproducing apparatus receives a reproduction instruction from the host 930 at operation 1310. In more detail, the host 930 transmits the reproduction instruction and a logical sector number of user data that is to be reproduced to the recording and/or reproducing apparatus 900, and an interface converts the logical sector number according to the reproduction instruction into a physical sector number.

The recording and/or reproducing apparatus reproduces the user data from a disc according to the reproduction instruction at operation 1320.

The system controller 915 searches for a layer corresponding to the physical sector number, and instructs the servo 914 to find a position corresponding to the physical sector number. The servo 914 controls the pickup 920 to move to the position corresponding to the physical sector number. The pickup 920 reproduces the user data from the physical sector number and transmits the user data to the RF AMP 913. The RF AMP 913 converts a signal reproduced from the pickup 920 into RF data and transmits the RF data to the DSP 912.

The recording and/or reproducing apparatus 900 decodes the reproduced user data using a data format used for the reproduced layer at operation 1330. In more detail, the DSP 912 performs signal processing with regard to the RF data and transmits the RF data to the data formatter 916. The data formatter 916 ECC decodes the RF data. At this time, the system controller 915 controls the data formatter 916 to decode the user data by using the data format used for the reproduced layer. The data formatter 916 decodes the user data using the data format used for the reproduced layer according to the control of the system controller 915, and transmits the decoded user data to the host 930 through the host I/F 911.

Aspects of the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, codes, and code segments for accomplishing aspects of the present invention can be easily construed by programmers of ordinary skill in the art to which the present invention pertains.

As described above, aspects of the present invention record and reproduce user data by using a plurality of multi data formats in order to reduce a drop in data reliability or a reduction in data capacity due to variations in signal quality of each layer of a multilayer information storage medium that uses the same reproducing and/or recording optical system per layer, thereby guaranteeing data reliability and increasing storage capacity.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An information storage medium comprising two or more recording layers on which data is recorded on and/or reproduced from by using a same recording and/or reproducing optical system for each of the two or more recording layers, wherein error correction code (ECC) blocks are recorded onto the two or more recording layers by using two or more data formats used to store user data,
   wherein the two or more data formats comprises a first data format and a second data format, and
   a proportion of additional information in relation to user data in the first format is different from the proportion of additional information in relation to user data in the second format, the additional information being information which is used to record and/or reproduce the user data wherein an optical beam which is used in reproducing the first data format is the same as an optical beam which is used in reproducing the second data format.

2. The information storage medium of claim 1, wherein an ECC block is recorded onto a recording layer having a cover layer with a first thickness by using a data format from among the two or more data formats that has a first error correction performance, and an ECC block is recorded onto another recording layer having another cover layer with a second thickness which is thinner than the first thickness by using a data format from among the two or more data formats that has a second error correction performance which is relatively high compared to the first error correction performance.

3. The information storage medium of claim 1, wherein each of the two or more recording layers comprises a disc management information area separate from a data area in which the user data is recorded, onto which at least one of the ECC blocks are recorded by using the same data format for each of the disc management information areas.

4. The information storage medium of claim 1, wherein first replacement data for replacing first user data of a first type ECC block having a first data format by performing a defect management operation or a logical overwrite (LOW) operation is stored onto the first type ECC block having the first data format, and second replacement data for replacing second user data of a second type ECC block having a second data format by performing the defect management operation or the LOW operation is stored onto the second type ECC block having the second data format.

5. The information storage medium of claim 4, further comprising:
   a first spare area formed in one of the recording layers onto which the first type ECC block is recorded and having the first replacement data of the first type ECC block recorded thereon; and
   a second spare area formed in a another one of the recording layers onto which the second type ECC block is recorded and having the second replacement data of the second type ECC block recorded thereon.

6. A method of recording data by a recording apparatus onto an information storage medium including two or more recording layers to reproduce or record the data by using a same reproducing and/or recording optical system per layer, the method comprising:
   recording ECC blocks onto the two or more recording layers by using two or more data formats used to store user data by a pickup of the recording apparatus,
   wherein the two or more data formats comprises a first data format and a second data format, and
   a proportion of additional information in relation to user data in the first format is different from the proportion of additional information in relation to user data in the second format, the additional information being information which is used to record and/or reproduce the user data wherein an optical beam which is used in reproducing the first data format is the same as an optical beam which is used in reproducing the second data format.

7. The method of claim 6, wherein the recording of the ECC blocks further comprises:
   recording one of the ECC blocks onto one of the recording layers having a cover layer with a first thickness by using one of the data formats which has a first error correction performance, and recording another one of the ECC blocks onto another one of the recording layers having another cover layer with a second thickness which is thinner than the first thickness by using another one of the data formats having a second error correction performance which is relatively high compared to the first error correction performance.

8. The method of claim 6, wherein each recording layer comprises a disc management information area, and the recording of the ECC blocks further comprises:
   recording the ECC blocks onto the disc management information area of each recording layer by using the same data format.

9. The method of claim 6, wherein the recording of the ECC blocks further comprises:
   storing first replacement data for replacing first user data of a first type ECC block having a first data format by performing a defect management operation or a logical overwrite (LOW) operation onto the first type ECC block having the first data format; and
   storing second replacement data for replacing second user data of a second type ECC block having a second data format by performing the defect management operation or the LOW operation onto the second type ECC block having the second data format.

10. The method of claim 9, wherein the recording of the ECC blocks further comprises:
   recording the first replacement data onto a first spare area of the information storage medium and recording the second replacement data onto a second spare area of the information storage medium that is separate from the first spare area.

11. An apparatus to record data onto an information storage medium including two or more recording layers to reproduce or record the data by using a same reproducing and/or recording optical system per layer, the apparatus comprising:
- a recording unit to record the data onto the information storage medium; and
- a controller to control the recording unit to record ECC blocks onto the two or more recording layers by using two or more data formats used to store user data,
- wherein the two or more data formats comprises a first data format and a second data format, and
- a proportion of additional information in relation to user data in the first format is different from the proportion of additional information in relation to user data in the second format, the additional information being information which is used to record and/or reproduce the user data wherein an optical beam which is used in reproducing the first data format is the same as an optical beam which is used in reproducing the second data format.

12. The apparatus of claim 11, wherein the controller controls the recording unit to record one of the ECC blocks onto a recording layer having a cover layer with a first thickness by using one of the data formats having a first error correction performance, and to record another one of the ECC blocks onto another one of the recording layers having another cover layer with a second thickness which is thinner than the first thickness by using another one of the data formats having a second error correction performance which is relatively high compared to the first error correction performance.

13. The apparatus of claim 11, wherein each recording layer comprises a disc management information area, the controller controls the recording unit to record at least one of the ECC blocks onto the disc management information area of each respective recording layer by using the same data format.

14. The apparatus of claim 11, wherein the controller controls the recording unit to store first replacement data for replacing first user data of a first type ECC block having a first data format by performing a defect management operation or a logical overwrite (LOW) operation onto the first type ECC block having the first data format, and to store second replacement data for replacing second user data of a second type ECC block having a second data format by performing the defect management operation or the LOW operation onto the second type ECC block having the second data format.

15. The apparatus of claim 14, wherein the controller controls the recording unit to record the first replacement data onto a first spare area of the information storage medium and the second replacement data onto a second spare area of the information storage medium that is separate from the first spare area.

16. A method of reproducing data by a reproducing apparatus from an information storage medium including two or more recording layers to reproduce or record the data by using a same reproducing and/or recording optical system per layer, the method comprising:
- reproducing ECC blocks from the two or more recording layers by using two or more data formats used to store user data by a pickup of the reproducing apparatus,
- wherein the two or more data formats comprises a first data format and a second data format, and
- a proportion of additional information in relation to user data in the first format is different from the proportion of additional information in relation to user data in the second format, the additional information being information which is used to record and/or reproduce the user data wherein an optical beam which is used in reproducing the first data format is the same as an optical beam which is used in reproducing the second data format.

17. The method of claim 16, wherein the reproducing of the ECC blocks further comprises:
- reproducing one of the ECC blocks from a recording layer having a cover layer with a first thickness by using one of the data formats having a first error correction performance, and reproducing another one of the ECC blocks from another recording layer having another cover layer with a second thickness which is thinner than the first thickness by using another one of the data formats having a second error correction performance which is relatively high compared to the first error correction performance.

18. The method of claim 16, wherein each recording layer comprises a disc management information area, and the reproducing of the ECC blocks further comprises:
- reproducing the ECC blocks from the disc management information area of each recording layer by using the same data format.

19. The method of claim 16, wherein the reproducing of the ECC blocks further comprises:
- reading first replacement data for replacing first user data of a first type ECC block having a first data format by performing a defect management operation or a logical overwrite (LOW) operation from the first type ECC block having the first data format; and
- reading second replacement data for replacing second user data of a second type ECC block having a second data format by performing the defect management operation or the LOW operation from the second type ECC block having the second data format.

20. The method of claim 19, wherein the reproducing of the ECC blocks further comprises:
- reproducing the first replacement data from a first spare area of the information storage medium and reproducing the second replacement data from a second spare area of the information storage medium that is separate from the first spare area.

21. An apparatus to reproduce data from an information storage medium including two or more recording layers to reproduce or record the data by using a same reproducing and/or recording optical system per layer, the apparatus comprising:
- a reproducing unit to reproduce the data from the information storage medium; and
- a controller to control the reproducing unit to reproduce ECC blocks from the two or more recording layers by using two or more data formats used to store user data,
- wherein the two or more data formats comprises a first data format and a second data format, and
- a proportion of additional information in relation to user data in the first format is different from the proportion of additional information in relation to user data in the second format, the additional information being information which is used to record and/or reproduce the user data wherein an optical beam which is used in reproducing the first data format is the same as an optical beam which is used in reproducing the second data format.

22. The apparatus of claim 21, wherein the controller controls the reproducing unit to reproduce one of the ECC blocks from a recording layer having a cover layer with a first thickness by using one of the data formats having a first error correction performance, and to reproduce another one of the ECC blocks from another recording layer having another cover layer with a second thickness which is less than the first thickness by using another one of the data formats having a second error correction performance which is relatively high compared to the first error correction performance.

23. The apparatus of claim 21, wherein each recording layer comprises a disc management information area, and the controller controls the reproducing unit to reproduce at least one the ECC blocks respectively recorded in each of the disc management information areas of each recording layer by using the same data format.

24. The apparatus of claim 21, wherein the controller controls the reproducing unit to read first replacement data for replacing first user data of a first type ECC block having a first data format by performing a defect management operation or a logical overwrite (LOW) operation from the first type ECC block having the first data format, and to read second replacement data for replacing second user data of a second type ECC block having a second data format by performing the defect management operation or the LOW operation from the second type ECC block having the second data format.

25. The apparatus of claim 24, wherein the controller controls the reproducing unit to reproduce the first replacement data from a first spare area of the information storage medium and the second replacement data from a second spare area of the information storage medium that is separate from the first spare area.

26. A method of recording data by a recording apparatus onto an information storage medium, the method comprising:
   recording error correction code (ECC) blocks on respective recording layers of the information storage medium by a pickup of the recording apparatus, wherein a ratio of user data to additional information used to record and/or reproduce the user data and included within each ECC block varies according to thicknesses of cover layers respectively corresponding to each of the recording layers wherein an optical beam which is used in reproducing a first data format is the same as an optical beam which is used in reproducing a second data format.

27. The method of claim 26, wherein an amount of the additional information increases relative to an amount of the user data as the thickness of the cover layer decreases.

28. The method of claim 26, wherein the additional information comprises parity information.

29. A method of reproducing data by a reproducing apparatus from an information storage medium, the method comprising:
   reproducing error correction code (ECC) blocks from respective recording layers of the information storage medium by a pickup of the reproducing apparatus, wherein a ratio of user data to additional information used to record and/or reproduce the user data and included within each ECC block varies according to thicknesses of cover layers respectively corresponding to each of the recording layers wherein an optical beam which is used in reproducing a first data format is the same as an optical beam which is used in reproducing a second data format.

30. The method of claim 29, wherein an amount of the additional information increases relative to an amount of the user data as the thickness of the cover layer decreases.

31. The method of claim 30, wherein the additional information comprises parity information.

* * * * *